United States Patent [19]

Schulze et al.

[11] 3,998,534

[45] Dec. 21, 1976

[54] ELECTRONIC PHOTOGRAPHIC FLASH UNIT

[75] Inventors: Axel Schulze, Wolfenbuttel; Stefan Borejko, Broitzem, both of Germany

[73] Assignee: Rollei-Werke Franke & Heidecke, Braunschweig, Germany

[22] Filed: Apr. 1, 1975

[21] Appl. No.: 564,160

[30] Foreign Application Priority Data

Apr. 9, 1974 Germany .......................... 2417242

[52] U.S. Cl. .................................. 352/200; 354/33; 354/145; 315/241 P

[51] Int. Cl.[2] ......................................... G03B 21/00

[58] Field of Search ............... 352/200; 354/32, 33, 354/34, 35, 129, 135, 139, 145, 149; 315/241 P

[56] References Cited

UNITED STATES PATENTS

| | | | |
|---|---|---|---|
| 3,710,701 | 1/1973 | Takashima | 354/145 |
| 3,779,142 | 12/1973 | Yata | 354/32 |

FOREIGN PATENTS OR APPLICATIONS

| | | | |
|---|---|---|---|
| 628,985 | 9/1946 | United Kingdom | 352/200 |

*Primary Examiner*—Monroe H. Hayes

*Attorney, Agent, or Firm*—Stonebraker, Shepard & Stephens

[57] ABSTRACT

An electronic flash unit for photographic purposes, in which there is a first thyristor in series with the flash tube, and a second thyristor which, in series with a quenching capacitor, is in parallel with the first thyristor. The first thyristor is quenched at the appropriate time, by quenching current from the quenching capacitor, and after the first thyristor has been rendered nonconductive, the second capacitor is also rendered nonconductive by forced commutation. The arrangement shortens the recovery time of the apparatus, as compared with prior art apparatus of this same general type, to such an extent that the flash apparatus may be used with a motion picture camera as well as a still camera, to produce one or more flashes during each shutter-open cycle of the motion picture camera. In a further development of the invention, a circuit is provided for producing three separate flashes during each opening of the shutter of a motion picture camera, thereby overcoming the stroboscopic effect which might be unpleasantly noticeable to a person being photographed, and producing flashes with such rapidity that to a person being photographed they will appear as a single continuous flash.

12 Claims, 3 Drawing Figures

ELECTRONIC PHOTOGRAPHIC FLASH UNIT

BACKGROUND OF THE INVENTION

The invention relates to an electronic flash unit with an automatic exposure control, which comprises a switching thyristor, which is in series with the flash tube and which can be blocked by the discharge current of a quenching capacitor, which is charged via a resistor and which is paralleled, in series with a further thyristor, to the switching thyristor.

In a known flash unit of this kind, the quenching capacitor is connected, on the one hand, via a resistor, to the positive pole of the main storage capacitor and, on the other hand, to the anode of the switching thyristor. A resistor is connected in parallel with the switching thyristor. The connecting point between the quenching capacitor and the resistor is connected to the cathode of the switching thyristor via a further thyristor, which is triggered by an exposure metering device. As soon as the quantity of light, radiated by the flash tube has reached a desired value, the exposure metering device emits an impulse to the control electrode of the further thyristor, so that the latter is triggered. The quenching capacitor is discharged via the triggered or conductive further thyristor, and the switching thyristor, whereby there is applied to the anode/cathode path of the switching thyristor, for the duration of the discharge, a negative voltage, under the action of which the charge carriers are withdrawn from the barrier or blocking layer of the switching thyristor and the switching thyristor blocks or becomes non-conductive. The resistor which connects the quenching capacitor to the positive pole of the storage capacitor is proportioned in such a way that after the decay of the discharge current from the quenching capacitor the residual current, which flows from the positive pole of the storage capacitor via the resistor and from the opened further thyristor, sinks below the holding current of the further thyristor and the latter thereby blocks. Now the quenching capacitor can be recharged to the operating voltage via the resistor connecting it to the positive pole of the main storage capacitor and in the case of a renewed ignition of the flash tube the quenching circuit for the switching thyristor is ready for operation.

If one wants to generate a rapid sequence of short light impulses with this flash unit, then a minimum time interval between the single impulses has to be observed, the greatest proportion of which interval being determined by the charging time of the quenching capacitor. The charge time constant of the quenching capacitor, which is dependent on the capacitance value of the quenching capacitor and the resistance value of the resistor which is connected between the quenching capacitor and the positive pole of the main storage capacitor, is not to be shortened at will, since the capacitance value of the quenching capacitor has to be proportioned to the recovery time or circuit commutated turn-off time of the switching thyristor and the resistor has to be proportioned to the magnitude of the holding current of the further thyristor. The value of resistance must therefore have a specific minimum magnitude, so that the quotient from the operating voltage or the voltage applied to the storage capacitor respectively and the value of resistance is smaller than the holding current of the further thyristor. Only in this case is it insured that the further thyristor can be returned to its blocking condition. Since the value of the holding current of a thyristor is very small, the resistor between the quenching capacitor or the anode of the further thyristor respectively and the positive pole of the main storage capacitor has to be proportioned very large with a conventional operating voltage of the flash unit of 360 volts, whereby the charging time of the quenching capacitor is increased which, in turn, only allows an impulse sequence with a great time interval.

It is therefore an object of the present invention to provide an electronic flash unit of the kind mentioned above, in which the time span from the emission of a quenching signal to the further thyristor by the exposure metering device until the renewed operating readiness of the quenching circuit for the switching thyristor is substantially shortened compared to the known flash units.

SUMMARY OF THE INVENTION

According to the present invention, this problem is solved by providing a device for the forced commutation of the further thyristor after the blocking of the switching thyristor.

In this manner, the proportioning of the resistor between the quenching capacitor and the positive pole of the storage capacitor can be selected independently of the magnitude of the holding current of the further thyristor, so that with a correspondingly low value of resistance very short charging times of the quenching capacitor are obtained.

According to a further development of the invention, it is particularly advantageous to connect the control electrode of the switching thyristor to a circuit arrangement for the generation of an ignition impulse, the time span from the ignition of the further thyristor until the emission of an ignition impulse by the circuit arrangement being proportioned longer than the quenching time of the flash tube. The result of this is that no further structural elements are required for the device for the forced commutation of the further thyristor in addition to the circuit arrangement for the generation of an ignition impulse, since the quenching capacitor for the switching thyristor now also supplies the quenching current for the further thyristor and the switching thyristor connects this quenching capacitor in parallel with the further thyristor for the purpose of quenching the further thyristor. In this manner, the same quenching circuit is used for quenching the switching thyristor, on the one hand, and for quenching the further thyristor, on the other hand.

In a further desirable development of the invention, the circuit arrangement comprises a timing element, and the timing element comprises an interlocking element, which can be released upon the ignition of the further tyristor until at least the impulse emission to the switching thyristor. With the aid of this timing element, the instant of the emission of an ignition impulse to the switching thyristor can be set in a simple manner.

The electronic flash unit according to the invention can be used with particularly great advantages as a light unit in conjunction with a motion picture camera. If, according to a further proposal of the invention, the ignition of the flash tube of the electronic flash unit is synchronized with the shutter opening position of a motion picture camera, it is possible to achieve the effect that each individual picture frame of the film is automatically correctly exposed as a result of the measurement of light effected by the exposure control device of the electronic flash unit. The synchronous ignition of the flash tube with the shutter opening position of the motion picture camera is brought about in a simple manner in that, according to a further feature of the invention, the ignition circuit for the flash tube comprises the series connection of a capacitor, which can be charged via a resistor, and the primary winding of an impulse transformer, whose secondary winding is connected to the ignition electrode of the flash tube, the synchronous contact of a motion picture camera being connected in parallel with the series connection of the capacitor and the primary winding. With film cameras which allow a synchronous sound recording of the film by means of a cassette recorder which records, in addition to the sound track, on a pilot track control impulses coming from the camera, such a synchronous contact is guided to the exterior of the camera so as to be accessible, so that the flashlight unit according to the invention can be connected in a simple manner.

The use of such a flash unit in filming motion pictures has decisive advantages over the hitherto usual illumination by means of halogen lights. In the first place, the considerable reduction of the energy requirement should be mentioned, which makes it possible to operate the lighting plant independently of stationary voltage networks and thus also allows filming with artificial light at places where such a voltage network is not available. Due to the low requirement, the energy can be derived from transportable accumulators or batteries of comparatively low weight, so that the filming person has substantially more flexibility with respect to the selection of the objects to be taken by him. Another advantage is the fact that there is no development of heat on the part of the studio lamps, which is felt to be unpleasant with conventional lighting equipment for motion picture filming.

The stroboscopic effect of the flash unit according to the invention, which may disturb a person that is to be filmed, can be eliminated by a slight modification of the ignition circuit. For this purpose, it is desirable that the flash unit should emit a plurality of flashes for each picture frame of the film, so that the flashlight appliance appears to the viewer as a continuously illuminated source of light. If, for example, three flashes are emitted by the flash unit for each picture at a filming rate of 25 pictures per second, then the human eye can no longer discern the individual flash impulses separately. However, in this case the threshold level of the exposure metering device, which indicates a sufficient exposure and at which an ignition signal for the quenching thyristor is emitted, has to be reduced by approximately a third, so that the desired exposure of the single picture is only obtained through the sum of the light fluxes emitted by the three single flashes. In a proposal according to this aspect of the invention, this mode of operation of the electronic flash unit is brought about in that the ignition circuit for the flash tube comprises the series connection of a capacitor, which is chargeable via a resistor, and the primary winding of an impulse transformer, whose secondary winding is connected to the ignition electrode, and a thyristor, whose control electrode is connected to the output of an impulse generator, being connected in parallel with the series connection of the capacitor and the primary winding. The impulse generator is blocked by a further interlocking element, whose blocking effect can be cancelled during the time that the shutter of the motion picture camera is open.

According to a further desirable expedient development of the invention, the interlocking element blocking the impulse generator is carried into effect by a monostable (mono-flop) multivibrator, which is connected to the impulse generator and in whose stable condition the impulse generator is switched on, in which connection the multivibrator can be flipped into is metastable condition upon the closing of the synchronous contact of the camera and the resetting time of the multivibrator is set according to the shutter opening time.

An electronic flash unit which is constructed in this manner can be used not only in conjunction with a motion picture camera, as described, but it also presents other advantageous possibilities of use. For example, this unit is particularly suitable for multi-exposure photographs taken with a still picture camera, such as are known for the purpose of demonstrating the pattern of a movement. While in the known methods the shutter of the camera is brought into the open position in a darkened room and single flashes now conver the photographic object in the sequence of its movement, it is possible with the flash unit according to the invention to effect such multi-exposures of the photographic with virtually any desired shutter time, for example in 1/30 sec. When the flash unit according to the invention is used, it is thus possible to take also fast sequences of movement in day light by means of the technique of multi-exposure, an additional advantage being the automatically correct exposure.

BRIEF DESCRIPTION OF THE DRAWINGS

An exemplified embodiment of the invention is represented in the drawings, in which.

DESCRIPTION OF THE PREFERRED EMBODIMENTS

Figure 1:
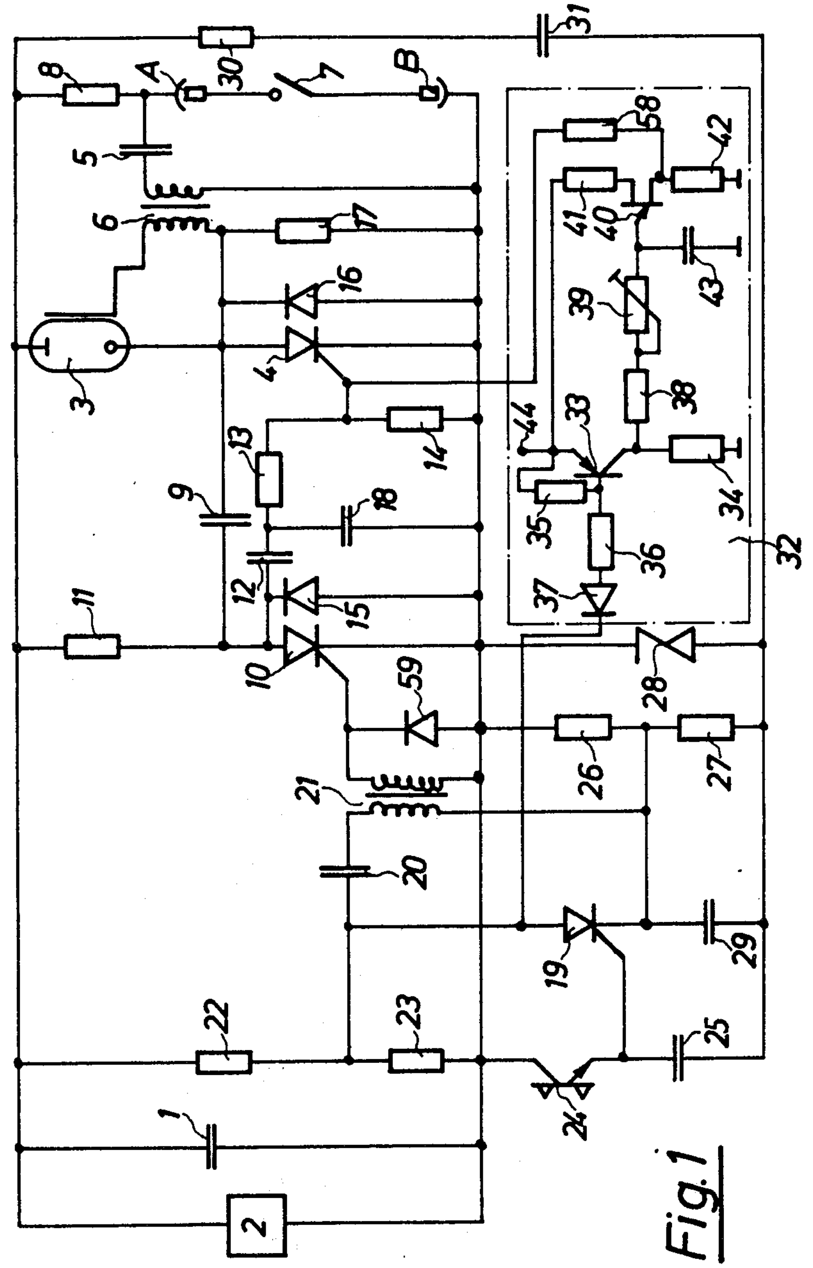
FIG. 1 shows the circuit diagram for the flash unit according to one embodiment of the invention.

The storage capacitor 1 of the electronic flash unit is charged, via a direct voltage converter 2, to the operating voltage, for example 360 V. direct voltage. The series connection of the flash tube 3 and the switching thyristor 4 is arranged parallel to the storage capacitor 1. The flash tube 3 is ignited by means of an ignition circuit, which consists of an ignition capacitor 5, the primary winding of an ignition transformer 6 and an open contact schematically representd at AB, which may be in the form of a receptacle into which a mating plug may be inserted. The synchronous contact switch 7 of a still camera or motion picture camera is in a circuit connection such as a cord or cable which is to be plugged into or otherwise connected to the contact AB. The ignition capacitor 5 can be charged to the operating voltage by the storage capacitor 1 or by the voltage transformer 2 via a resistor 8. The secondary winding of the ignition transformer 6 is connected to the ignition electrode of the flash tube 3.

In order to quench the switching thyristor 4, the series connection consisting of the quenching capacitor 9 and the quenching thyristor 10 is connected in parallel with it. The quenching capacitor 9 can be charged by the storage capacitor 1 or the voltage transformer 2, via a resistor 11. The series connection of a capacitor 12 and a voltage divider, consisting of the resistors 13 and 14, is connected in parallel with the quenching thyristor 10. The control electrode or control gate of the switching thyristor 4 is connected to the divider tap of the voltage divider 13, 14. A diode 15 has a back-to-back connection to the quenching thyristor 10, and a diode 16 has a back-to-back connection to the switching thyristor 4.

In addition, a resistor 17 lies in parallel with the switching thyristor 4. A capacitor 18 is furthermore connected in parallel with the voltage divider 13, 14 for the suppression of interference impulses. The quenching thyristor 10 can be ignited (i.e., made conductive) via a trigger circuit comprising the series connection of a thyristor 19, a capacitor 20 and the primary winding of an impulse transformer 21. For this purpose, the secondary winding of the impulse transformer 21 is connected to the control electrode/cathode path of the quenching thyristor 10. For protection of the thyristor 10, a self-oscillating diode 59 is connected in parallel with the secondary winding. The capacitor 20 can be charged via a voltage divider circuit, which is connected in parallel with the storage capacitor 1 and which consists of the resistors 22 and 23, the charging potential being in accordance with the divider ratio.

The thyristor 19 can be ignited via an exposure metering device, which measures the light emitted by the flash tube and reflected by the object being photographed. This exposure metering device comprises a series connected of a photo transistor 24 and an integrating capacitor 25, the control electrode of the thyristor 19 being connected to the connecting point of the photo transistor and the integrating capacitor. A voltage divider circuit, comprising the resistors 26 and 27, and a Zener diode 28, lies in parallel with this series connection of the photo transistor and the integrating capacitor. The divider tap is connected to the cathode of the thyristor 19. To improve the response of the exposure measurement circuit at close range, a capacitor 29 is connected in parallel with the divider resistor 27. A series connection, comprising the resistor 30 and the capacitor 31, is disposed between the anode of the flash tube 3 and the anode of the Zener diode 28. It serves for supplying the exposure metering device with power during the flash phase of the electronic flash tube.

Furthermore, there is provided a circuit arrangement indicated in general at 32 for the generation of an ignition impulse for the switching thyristor 4. It comprises a pnp transistor 33, whose emitter/collector path is connected in series with a resistor 34 to a constant voltage source 44 of, for example, 12 V. The base of the transmitter 33 is connected, via a resistor 35, to its emitter and, via a resistor 36 and a diode 37, to the anode of the thyristor 19 in the trigger circuit for the quenching capacitor 10. The emitter of a uni-junction transistor 40, whose bases are applied to the constant voltage source 44 via the base resistors 41 and 42, is connected to the collector of the transistor 33 via a fixed resistor 38 and a variable or adjustable resistor 39. The base resistor 42 is connected to the negative pole of the voltage source 44. A capacitor 43 lies parallel to the series connection of the emitter base path of the uni-junction transistor 40 and the base resistor 42. The base of the uni-junction transistor 40, which is connected to the base resistor 42, is connected to the control electrode of the switching thyristor 4 via a resistor 58.

The mode of operation of the electronic flash unit according to this embodiment of the invention is as follows:

When the electronic flash unit is ready for the flash operation, the storage capacitor 1, the quenching capacitor 9, the ignition capacitor 5, the capacitor 12, and the capacitor 31 are all charged to the operating voltage, while the capacitor 20 is charged to a voltage value that is reduced according to the divider ratio of the voltage divider 22, 23. The transistor 33 is blocked, since its base is connected via the resistor 35 to the positive pole of the direct voltage source 44.

Upon the actuation of the camera release, the synchronous contact 7 of the camera is closed, and this happens when the shutter of the still picture camera or the motion picture camera has reached its maximum opening position. Upon the closure of the synchronous contact 7, the ignition capacitor 5 is discharged via the primary winding of the ignition transformer 6, an ignition impulse being generated in the secondary winding, which impulse ignites the flash tube 3 via the ignition electrode. Upon the ignition of the flash tube, the anode potential of the switching thyristor 4 rises suddenly from zero. This potential jump passes via the capacitors 9 and 12 to the control electrode of the switching thyristor 4, so that the latter is triggered (i.e., becomes conductive). Now the storage capacitor 1 is discharged via the flash tube and the switching thyristor, and the flash tube radiates a light flash. At the same time, the capacitor 31 is also discharged via the resistor 30, the flash tube 3, the thyristor 4 and the voltage divider circuit 26 and 27. The voltage drop at the resistors 26 and 27 is kept at a constant value by the Zener diode 28, so that a constant supply voltage is applied to the series connection of the photo transistor 24 and the integrating capacitor 25. The flash radiated by the flash tube illuminates the object to be photographed, is reflected from there and passes onto the photo transistor 24. Depending on the intensity of the light, a more or less large current flows through the photo transistor 24 and charges the integrating capacitor 25.

When the integrating capacitor 25 reaches a specific adjustable voltage, which is higher than the cathode potential of the thyristor by the amount of ignition voltage of the thyristor 19, the thyristor 19 is triggered and the capacitor 20 is discharged via the primary winding of the impulse transformer 21. In the secondary winding there develops an ignition impulse, which passes to the control grid of quenching thyristor 10 and connects the latter through (i.e., makes it conductive). Consequently, the quenching capacitor 9 is discharged in known manner via the triggered quenching thyristor 10 and via the diode 16. For the duration of the discharging of the quenching capacitor 9, which is longer than the recovery time (circuit-commutated turn-off time) of the thyristor 4, a negative voltage, which corresponds to the on-voltage or forward voltage of the diode 16, is applied to the thyristor 4, so that the thyristor blocks. The recovery time (circuit-commutated turn-off time) of the thyristor is approximately 10 $\mu$ sec. As soon as the thyristor 4 has blocked, the capacitor is charged in reversed polarity via the still conductive flash tube 3 and the triggered (i.e., conductive) quenching thyristor 10. With the capacitor 9 charged and the thyristor 4 blocked, the flash tube is then quenched, because the high value of the resistor 17 allows only a very small current, and the flash radiation is interrupted. The quenching time of the flash tube is approximately 100 to 200 $\mu$ sec., calculated from the moment at which the quenching thyristor 10 is triggered.

Upon the connecting-through or firing of the thyristor 19, a negative potential is applied to the base of the transistor 33 of the switching arrangement 32 for the duration of the discharging of the capacitor 20. The transistor 33 becomes conductive and the capacitor 43 can be charged at a time constant determined by the resistor 39. As soon as the capacitor voltage exceeds the breakdown voltage of the uni-junction transistor 40, there develops at the base resistor 42 a voltage impulse which passes to the control electrode of the switching thyristor 4 and renders this thyristor conductive. The charging time of the capacitor 43 is proportioned longer than the quenching time of the flash tube 3, so that at that moment when the thyristor 4 is triggered once again, the flash tube is already blocked.

Since the plate of the quenching capacitor 9 which is connected to the anode of the switching thyristor 4, now has a positive potential, the quenching capacitor 9 is discharged via the conductive thyristor 4 and the diode 15 when this switching thyristor becomes conductive (i.e., is triggered), so that a negative voltage is applied to the quenching thyristor 10 for the duration of the discharging of the quenching capacitor 9, and the thyristor 10 blocks (i.e., becomes non-conductive). The capacitor 9 is now charged via the resistor 11, which can be small in dimension, and the conductive switching thyristor 4, in a very short time, which is determined by the value of the resistor 11 and the capacitance of the capacitor 9. As soon as the charging current through the capacitor 9 and the thyristor 4 sinks below the value of the holding current of the thyristor 4, the thyristor 4 blocks and the electronic flash unit is again ready for a flash operation. Upon the decay of the discharge of the capacitor 20 in the trigger circuit, via the thyristor 19, the transistor 33 blocks again, too, so that the circuit arrangement 32 cannot emit any further impulse to the control electrode of the thyristor 4.

Figure 3:
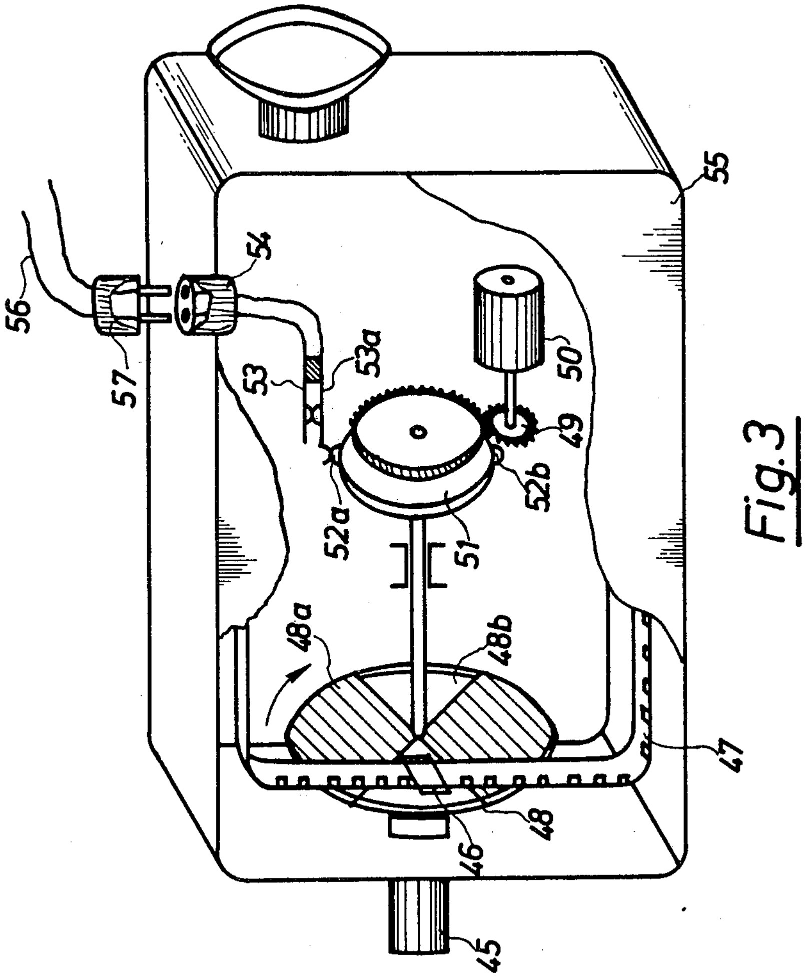
FIG. 3 is a diagrammatical representation of a motion picture camera, illustrating the mode of operation of the flash unit in conjunction with the camera.

In FIG. 3, a motion picture camera is shown schematically. Light from the object enters the camera through the objective or lens 45 of the camera, and passes through the picture gate 46 onto the film 47 that is to be exposed. Between the objective and the picture gate a rotary disk shutter 48 of conventional construction is arranged. This shutter comprises the opaque sectors **48*a* and the openings or transparent sectors 48*b*, the size of which can be varied according to the prevailing exposure conditions, as well understood in the art. The rotary disk shutter is driven at a constant speed via gearing 49 from a motor 50. The drive (not shown) for the film strip 47** is also synchronously coupled with the shutter drive.

A cam disk 51, which carries two cams **52*a* and 52*b*, rotates with the rotary shutter 48. A synchronous contact switch 53 is arranged in such a way that the cams 52*a* and 52*b* close the contact each time that they respectively engage the lever arm 53*a* of the synchronous contact switch, during the rotation of the cam disk 51.** The cams are so placed that the synchronous contact is closed just as the rotary disk shutter reaches its completely open position, for passage of the light beam to the film.

The connecting conductors for the synchronous contact 53 are connected to a socket 54 in a wall of the housing 55 of the camera. From here they can be connected by any conventional means such as conductors 56 and a plug 57 to the contacts A and B in FIG. 1.

With this arrangement, the synchronous contact switch 53 is closed each time that the rotary disk shutter 48 reaches a fully open position, so that the flash unit then emits a flash in the described manner. As soon as the quantity of light that is required for an optimum exposure of the picture has been measured by the exposure metering device, the flash radiation is interrupted in the described manner. Since 18 or 24 pictures are taken per second with a motion picture camera, a corresponding number of electronic flashes is triggered via the synchronous contact switch 53 of the camera. The exposure of each individual picture is measured automatically and when the correct light value is attained, the flash radiation is interrupted.

Figure 2:
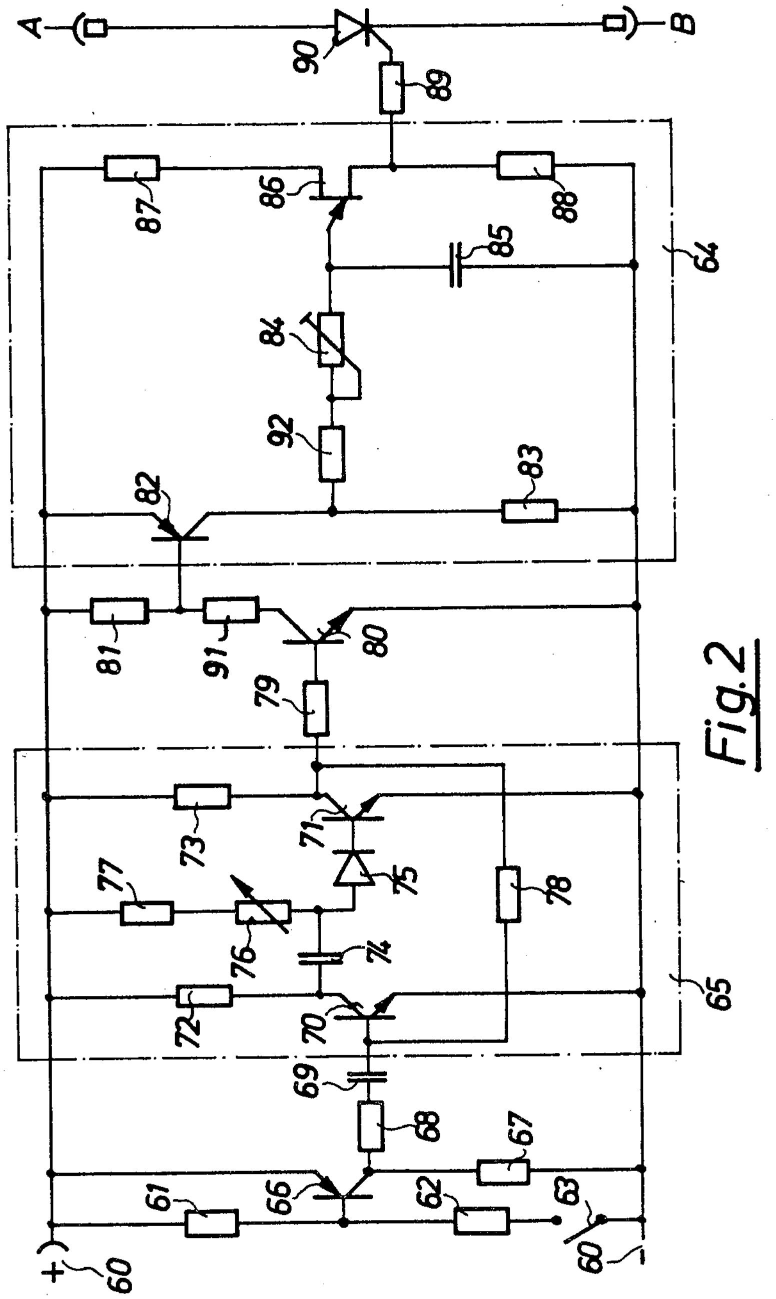
FIG. 2 shows a modification of the ignition circuit of the flash tube of the electronic flash unit according to FIG. 1.

In order to arrange matters so that the individual flash impulse can no longer be perceived by the human eye, it is possible, by way of a simple supplement to the electronic flash unit according to the invention, to trigger several flashes in succession with the rotary shutter fully opened during the single closure of the synchronous contact switch, so that the flash frequency is increased to such a considerable extent that the flash unit is seen by the eye as a continuously illuminated source of light, due to the well known "persistence if image" phenomenon. In order to bring about the correct exposure of the respective individual pictures or "frames" of the film strip, the threshold value of the integrating capacitor, at which value the thyristor 19 ignites through or fires, has to be reduced according to the number of the individual flashes for each single exposure. The sum of the flashes which illuminate a single picture frame or exposure then gives the desired optimum exposure of the photographic film. An exemplified embodiment of this further development of the invention is shown in FIG. 2.

The series connection of a voltage divider, consisting of the resistors 61 and 62, and a synchronous contact switch 63, (which is in the form, for example, of the synchronous contact switch 53 in FIG. 3 or of any conventional synchronous contact switch of any desired still picture camera) is arranged parallel to a constant voltage source 60, for example 6 volt direct voltage. Parallel thereto, is the emitter/collector path of a transistor 66, in whose collector branch a resistor 67 is inserted and whose base is connected to the divider tap of the voltage divider 61, 62. The direct voltage source 60 delivers the same time the supply voltage for an impulse generator indicated in general at 64 and a monostable multi-vibrator (mono-flop) indicated in general at 65. The collector of the pnp transistor 66 is connected to one switching transistor 70 of the monostable vibrator 65 via a resistor 68 and a capacitor 69.

The monostable unit 65 comprises two npn switching transistors 70 and 71, in whose respective collector branches resistors 72 and 73 respectively are inserted. The collector of the switching transistor 70 is connected also to the base of the switching transistor 71 via a capacitor 74 and a diode 75. The connecting point between the capacitor 74 and the diode 75 is connected to the positive pole of the supply voltage source 60 via an adjustable resistor 76 and, if desired, a further resistor 77. The base of the switching transistor 70 is connected via a resistor 78 to the collector of the switching transistor 71 which is connected, on the other hand, via a resistor 79 to the base of a npn transistor 80. The collector of this transistor 80 is connected, through a resistor 81 and a resistor 91, to the positive side of the direct voltage source, and the emitter of this transistor 80 is connected to the negative side of the same voltage source 60.

The collector of the transistor 80 is also connected via the resistor 91 to the base of a pnp transistor 82, which is part of the impulse generator 64. In the collector branch of the transistor 82, which is also arranged parallel to the direct voltage source 60, there is a resistor 83, in parallel with which there is a series connection of a fixed resistor 92, a variable resistor 84, and a capacitor 85. The emitter of a uni-junction transister 86, whose bases are connected to the direct voltage source 60 via the resistors 87 and 88, is connected to the connecting point between the resistor 84 and the capacitor 85. The base resistor 88 is applied to the negative pole of the direct voltage source 60. The control electrode or gate of a thyristor 90 is connected via a resistor 89 to the base of the uni-junction transistor 86, which is connected to the resistor 88. The anode of the thyristor 90 is connected to the contact A and the cathode of the thyristor 90 is connected to the contact B shown in FIG. 1, the synchronous contact 7 shown in FIG. 1 being dispensed with.

The mode of operation of this circuit arrangement, as shown in FIG. 2 in conjunction with FIG. 1, is as follows:

The electronic flash unit is in a position of readiness. The transistor 66 is blocked, the transistor 71 is conductive, since its base is connected to the positive pole of the direct voltage source via the diode 75 and the adjustable resistor 76. But when the transistor 71 is conductive, the base of the switching transistor 70 is applied to the negative pole of the direct voltage source, so that the transistor 70 is blocked and the monostable multivibrator is in its stable condition. Due to the connected-through or conductive transitor 71, the transistor 80 is also blocked and, as a result, the transistor 82 is also not conductive, so that the impulse generator 64 is switched off.

If the synchronous contact 63 (corresponding, e.g., to the synchronous contact switch 53 in FIG. 3) is now closed, then the transistor 66 becomes conductive and a positive impulse passes to the base of the switching transistor 70, which pulse causes the transistor 70 to connect through or become conductive. When the transistor 70 becomes conductive a negative impulse passes to the base of the transistor 71 via the capacitor 74, so that this transistor 71 blocks and the base of the transistor 70 is connected to the positive pole of the direct voltage source via the resistors 73 and 78. With the blocking of the transistor 71 the transistor 80 becomes conductive and consequently also the transistor 82. The capacitor 85 can be charged at a time constant that is determined by the adjustable resistor 84 until the breakdown voltage of the uni-junction transistor 86 is reached and the capacitor is discharged via the emitter/base path of the uni-junction transistor and the resistor 88. Through the voltage drop at the resistor 88 an ignition impulse develops at the control electrode of the thyristor 90, so that the thyristor 90 becomes conductive. The connecting-through or firing of the thyristor 90 corresponds to the closing of the synchronous contact 7 in the description relating to FIG. 1, so that there now follows the above described process of the ignition of the flash tube, the light measurement and the switching-off of the flash radiation.

While the flash tube is quenched again in the described manner, the capacitor 85 has been discharged to such an extent that the uni-junction transistor 86 blocks again and the charging of the capacitor 85 occurs once more via the resistor 84. When the threshold voltage is reached, the uni-junction transistor ignites through once more, the thyristor 90 becomes conductive once more, and the flash tube is again ignited in the described manner, the light radiated by it is measured, and after an adjustable time the flash radiation is again interrupted by the ignition of the thyristor 19.

The frequency of the ignition impulses for the thyristor 90, and consequently the number of flashes, can now be adjusted by means of the variable resistor 84. As the minimum charging time in respect of the capacitor 85, the time must be considered which elapses with a maximum distance of the flash unit (or the camera) from the object being photographed, from the moment of the ignition of the flash tube to the moment of the recharging of the quenching capacitor 9 according to the description relating to FIG. 1.

The impulse generator 64 can work as long as the monostable unit 65 is in its metastable condition, i.e., as long as the switching transistor 71 is blocked and the transistor 70 is conductive. This so-called resetting time of the multivibrator unit 65 is determined by the charging of the capacitor 74 via the adjustable resistor 76. With the transistor 70 connected through, the capacitor 74 is charged, whereby a positive potential reaches the base of the transistor 71. When the potential at the plate of the capacitor 74 which is connected to the anode of the diode 75, exceeds the emitter potential of the transistor 71 by the voltage drop in the diode 75 and in the base/emitter path of the transistor 71, then the transistor 71 becomes conductive, whereby a negative potential reaches both the base of the transistor 70 and the base of the transistor 80. These transistors block, the monostable vibrator unit 64 resumes its stable condition, and the impulse generator 64 is switched off. The resetting time of the monostable unit must therefore be adapted to the shutter-open time of the still picture camera or motion picture camera, as the case may be, so that upon a renewed closure of the synchronous contact switch when the shutter is opened once more, the described process can be initiated again.

The circuit arrangement according to FIG. 2 in conjunction with FIG. 1 can be advantageously used not only for motion picture cameras but also for still picture cameras when so-called multi-exposure photographs are to be taken, i.e., when the same picture is exposed several times. If the adjusting resistor 76 is coupled with the setting mechanism for the shutter opening time and the setting of the resistor 76 is adapted to the selected shutter opening time accordingly, it is possible to bring about, with optional shutter closing times, any desired number of exposures for each picture by means of the adjustable resistor 84.

What is claimed is:

1. An electronic photographic flash unit with automatic exposure control, comprising a. a flash tube, b. current supply means for supplying current to said flash tube, c. a first thyristor serving as a switching thyristor and connected in series with said flash tube, d. a quenching capacitor, e. means including a resistor in series with said quenching capacitor for charging said quenching capacitor, f. a second thyristor serving as a quenching thyristor and connected in series with said quenching capacitor in a circuit in parallel with said first thyristor, g. circuit means for rendering said first thyristor non-conductive in response to a discharge current from said quenching capacitor, and h. means for producing forced commutation of said second thyristor after said first thyristor has been rendered non-conductive.

2. The invention defined in claim 1, further comprising circuit means (32) operatively connected to a control electrode of said first thyristor, for generating an ignition impulse to said electrode, said circuit means being so proportioned that the time interval from the moment of ignition of said second thyristor to the moment of generation of said ignition impulse to the control electrode of said first thyristor is longer than the time required to quench a flow of flash current in said flash tube.

3. The invention defined in claim 2, wherein said circuit means (32) comprises a timing assembly (39, 43), an interlocking element (33) for blocking said timing assembly, and means for unblocking said timing assembly upon ingnition of said second thyristor until at least the moment of generation of said ignition impulse to said first thyristor.

4. The invention defined in claim 1, further comprising a motion picture camera having a shutter movable successively through open positions and closed positions, and means for synchronizing flashing of said flash tube with opening movements of said shutter of said motion picture camera.

5. The invention defined in claim 4, wherein said flash tube has an ignition circuit comprising a. an impulse transformer having a primary winding and a secondary winding, b. a capacitor, c. a resistor, d. a circuit including said resistor through which said capacitor may be charged, e. a series connection serving to connect said capacitor and said primary winding in series with each other, f. a synchronous contact switch closed in synchronism with opening movement of said shutter of said motion picture camera, g. circuit means connecting said switch in parallel with said capacitor and primary winding, h. an ignition electrode for said flash tube, and i. a circuit connection from said secondary winding to said electrode.

6. The invention defined in claim 1, wherein said flash tube has an ignition circuit comprising a. an impulse transformer having a primary winding and a secondary winding, b. a capacitor, c. a resistor, d. a circuit including said resistor through which said capacitor may be charged, e. a series connection serving to connect said capacitor and said primary winding in series with each other, f. a thyristor having a control electrode, g. an impulse generator having an output, h. a circuit connecting said output to said control electrode, i. circuit means connecting said thyristor in parallel with said capacitor and primary winding, j. an ignition electrode for said flash tube, and k. a circuit connection from said secondary winding to said ignition electrode.

7. The invention defined in claim 6, further comprising means for blocking said impulse generator, and means synchronized with movement of a shutter of a camera for rendering said blocking means ineffective while said shutter is open.

8. The invention defined in claim 7, wherein said blocking means includes a monostable multivibrator unit having a stable condition in which said impulse generator is blocked and an unstable condition in which said generator is not blocked.

9. The invention defined in claim 7, wherein said shutter is a constantly moving shutter of a motion picture camera.

10. The invention defined in claim 7, wherein said shutter is a shutter of a still camera.

11. A flash unit as defined in claim 1, wherein said means for producing forced commutation of said second thyristor comprises said first thyristor (4), said quenching capacitor (9), and circuit connection means (32) producing a pulse applied to said first thyristor to render said first thyristor conductive again after termination of a flash from said flash tube, said quenching capacitor (9) supplying a commutating current to said second thyristor (10) through the again conductive first thyristor (4).

12. A flash unit as defined in claim 11, further comprising adjustable means for causing a time lag in the production of said pulse applied to said first thyristor, so that after said first thyristor has become non-conductive to initiate a thermination of a flash from said flash tube, said first thyristor will not be rendered conductive again, to enable commutation of said second thyristor, until after a sufficient time interval to allow said flash tube to reach a blocked condition.

* * * * *